United States Patent [19]
Seibert

[11] Patent Number: 6,003,234
[45] Date of Patent: Dec. 21, 1999

[54] RECEPTACLE LEVEL

[76] Inventor: John R. Seibert, 4415 Urban Dr., Evansville, Ind. 47720

[21] Appl. No.: 09/035,416

[22] Filed: Mar. 5, 1998

Related U.S. Application Data

[60] Provisional application No. 60/040,101, Mar. 10, 1997.

[51] Int. Cl.⁶ .................................................. G01C 9/28
[52] U.S. Cl. ...................................... 33/371; 33/DIG. 10
[58] Field of Search .............................. 33/333, 334, 370, 33/371, 372, 379, 528, 645, DIG. 10

[56] References Cited

U.S. PATENT DOCUMENTS

| | | | |
|---|---|---|---|
| 3,123,918 | 3/1964 | Crabtree | 33/528 |
| 3,745,664 | 7/1973 | Altseimer | 33/528 |
| 4,126,944 | 11/1978 | Burkhart | 33/DIG. 10 |
| 4,888,880 | 12/1989 | Parker | 33/DIG. 10 |
| 5,168,235 | 12/1992 | Bonner | 33/379 |
| 5,505,001 | 4/1996 | Schaver, Jr. | 33/DIG. 10 |

*Primary Examiner*—G. Bradley Bennett
*Attorney, Agent, or Firm*—George Morgan

[57] ABSTRACT

The present invention is a receptacle level that simulates a male electrical plug and also contains a liquid bubble level such that when the device is plugged into an electrical wall outlet, proper orientation of the wall outlet can be obtained by reading the bubble level. The receptacle level includes tapered male plugs and fits within coverplate clearances as are typically used with the electrical wall outlet to be leveled. This device simplifies the leveling of electrical wall outlets during installation.

1 Claim, 4 Drawing Sheets

Prior Method and Tool

RECEPTACLE LEVEL

This application claims the benefit of U.S. Provisional No. 60/040,101 filed Mar. 10, 1997.

CROSS-REFERENCE TO RELATED APPLICATIONS

None.

STATEMENT AS TO RIGHTS TO INVENTIONS MADE UNDER FEDERALLY-SPONSORED RESEARCH AND DEVELOPMENT

Not applicable.

BACKGROUND OF THE INVENTION (1) Field of the Invention

The present invention is a level that can be inserted into an electrical receptacle for the purpose of leveling the receptacle.

(2) Description of the Prior Art

Currently, many electrical receptacles are installed and leveled with a level known as a torpedo level. It is difficult to get the electrical receptacle installed properly while holding the torpedo level against the edge of the electrical receptacle. Also, care has to be exercised to avoid scarring finished wall covering while holding the torpedo level against the edge of the electrical receptacle while trying to fasten the electrical receptacle to a mounting box. This is relatively time consuming and awkward. With an injured or missing hand, it is virtually impossible.

There is an ELECTRICIAN'S LEVEL™ from Infiniti Incorporated, 164 East Center Street, North Salt Lake, Utah 84054 Ph. 1-800-380-8043 that incorporates a level into a plug, but it lacks some desirable features. The male plugs are standard male plugs which are difficult to insert in some of the standard receptacles and tend to be held in at least one of the standard receptacles sufficiently tight as to be difficult to remove. The difficulties in inserting and removing lead to wear and a relatively short life. Also, an extra handling of the ELECTRICIAN'S LEVEL™ is required to level a cover plate for the receptacle. While these shortcomings might seem trivial for a given leveling operation, over the course of hours and days, for a residential construction electrician, these are decided disadvantages.

Prior art patents uncovered in searching:

U.S. Pat. No. 3,123,918 Mar. 10, 1964 Crabtree
U.S. Pat. No. 3,116,563 Jan. 7, 1964 Gelbman
U.S. Pat. No. 4,888,880 Dec. 26, 1989 Parker Crabtree is a device for aligning receptacle and wall switch cover plates that is not as compact or as convenient to use as the present invention.

Gelbman is an installation fixture, similar in intended use, that is also not as compact or as convenient to use as the present invention.

Parker is an electrician's level that is a combination template and spirit level that is more cumbersome to use than is the present invention for its intended purpose.

As will be seen from the subsequent description of the preferred embodiments of the present invention, these shortcomings of the prior art are overcome.

SUMMARY OF THE INVENTION

The present invention is a device that permits leveling an electrical receptacle and subsequently its cover plate easier and quicker than is possible with existing methods.

DESCRIPTION OF THE PREFERRED EMBODIMENTS

Figure 1:
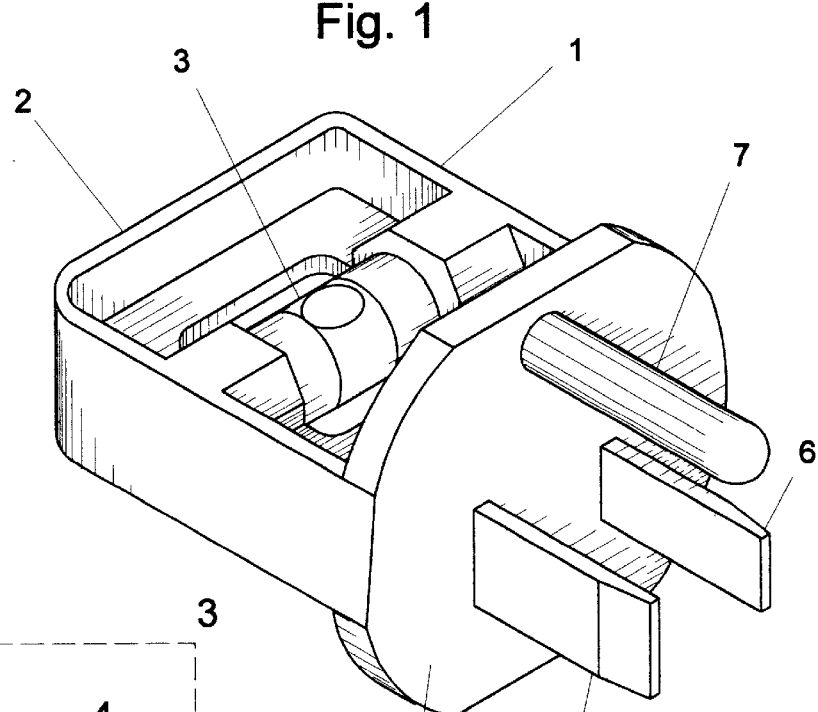
FIG. 1 shows a perspective view of the present invention.
Figure 2:
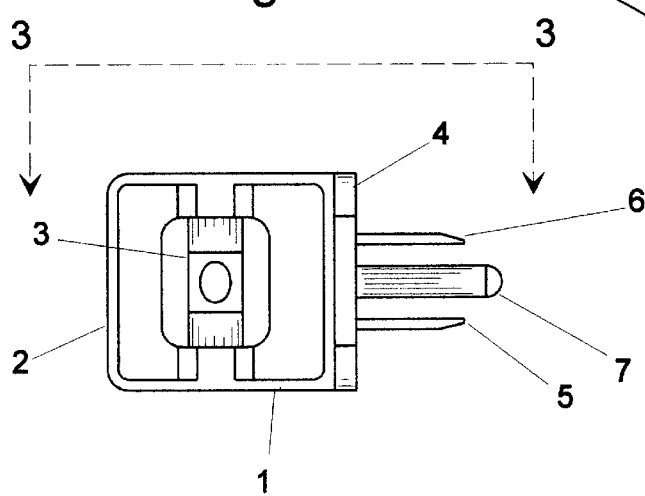
FIG. 2 shows a top view of the present invention.
Figure 3:
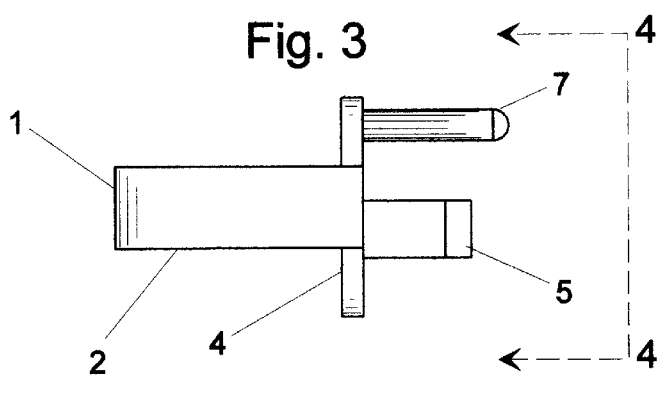
FIG. 3 shows a side view of the present invention.
Figure 4:
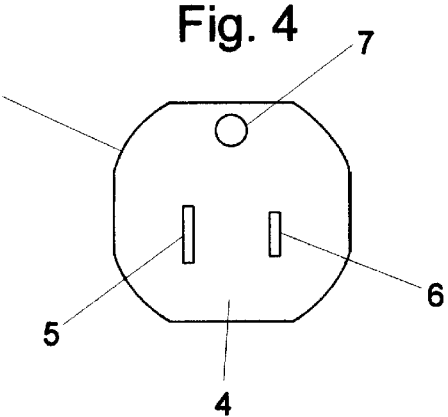
FIG. 4 shows an end view of the present invention.

Referring to FIGS. 1, 2, 3, and 4, it can be seen that the preferred embodiment of the present invention, a receptacle level 1, includes a housing 2, a liquid bubble level 3, and outlet shield 4, a polarized tapered male plug prong 5, a tapered male plug 6, and a ground male plug 7. In FIG. 4 it can be seen that the polorized tapered male plug prong 5 is a different size than the tapered male plug 6. This conforms to industry standards that insure proper orientation of an electrical plug when it is plugged into an electrical outlet. The taper on the each of the polarized tapered male plug prong 5 and the tapered male plug 6 is for easier insertion and removal and less wear on said plugs during the intended usage. I found that standard, non-tapered male plugs tended to jam at time of insertion into, and sieze up at time of removal from, standard electrical receptacles. Also, there is less wear on the tapered plugs, which are typically of plastic, than would be the case of non-tapered plugs. The term polarized male plug prong 5 is used to indicate which receptacle of a N.E.M.A. standard polarized and grounded electrical wall outlet it will fit, not that it is has electrical connotation. Similarly, the term ground male plug 7 is used to indicate what part of the N.E.M.A. standard polarized and grounded electrical wall outlet it will fit, not that the ground male plug 7 is actually grounded.

Figure 5:
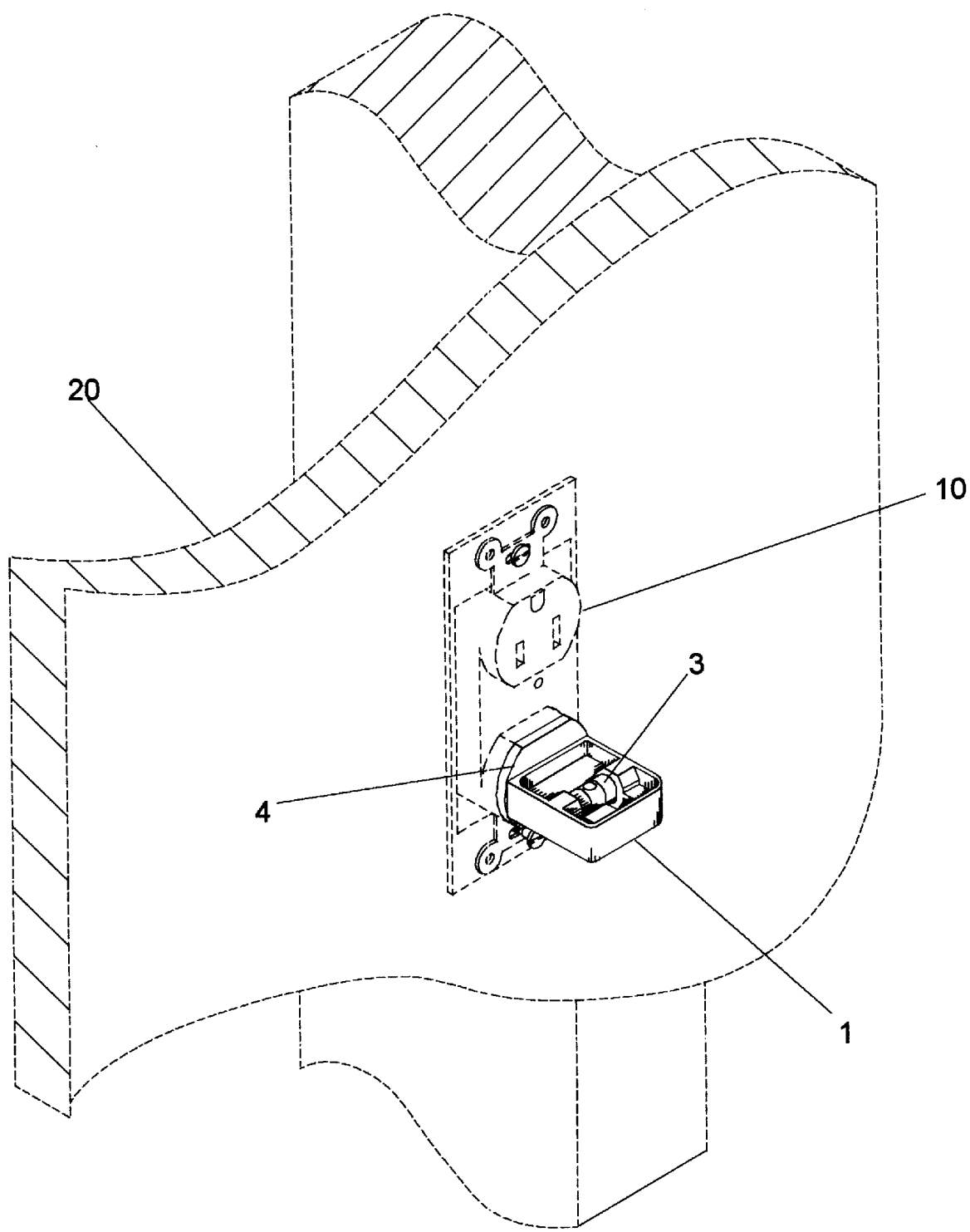
FIG. 5 shows the present invention in position.

FIG. 5 shows the receptacle level 1 inserted into an electrical wall outlet 10 which typically is a N.E.M.A. 110 volt standard polarized and grounded electrical wall outlet, contained in a wall section 20, such as commonly used in residential, commercial and industrial facilities. The electrical wall outlet 10 and the wall section 20 are not a part of the present invention so are shown with dotted lines.

Figure 6:
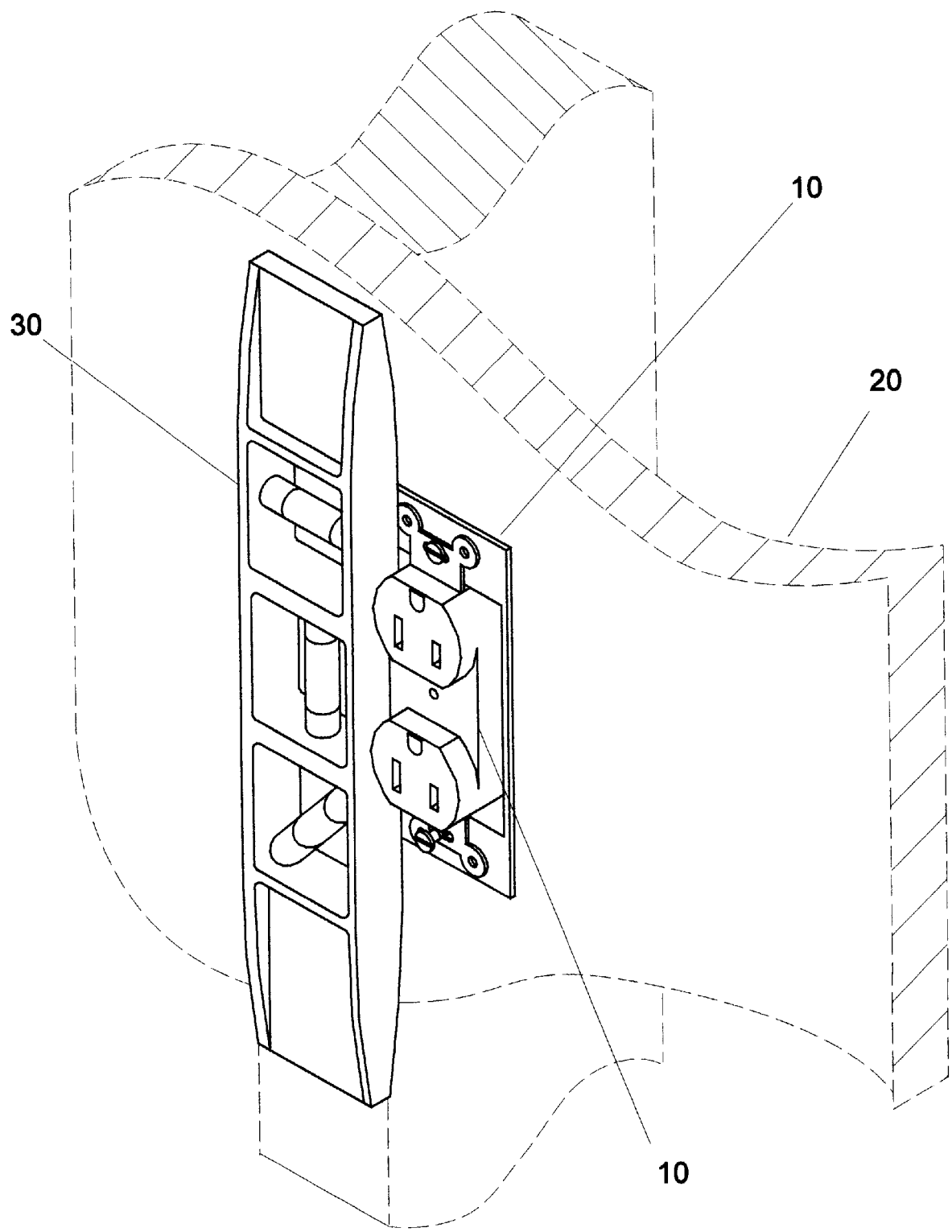
FIG. 6 shows a prior art method and tool that is obsoleted by the present invention.

FIG. 6 indicates a prior art approach using a prior art torpedo level 30 to insure the electrical wall outlet 10 is installed properly leveled. When the wall outlet 10 is properly aligned, it is considered "leveled" by electricians.

Figure 7:
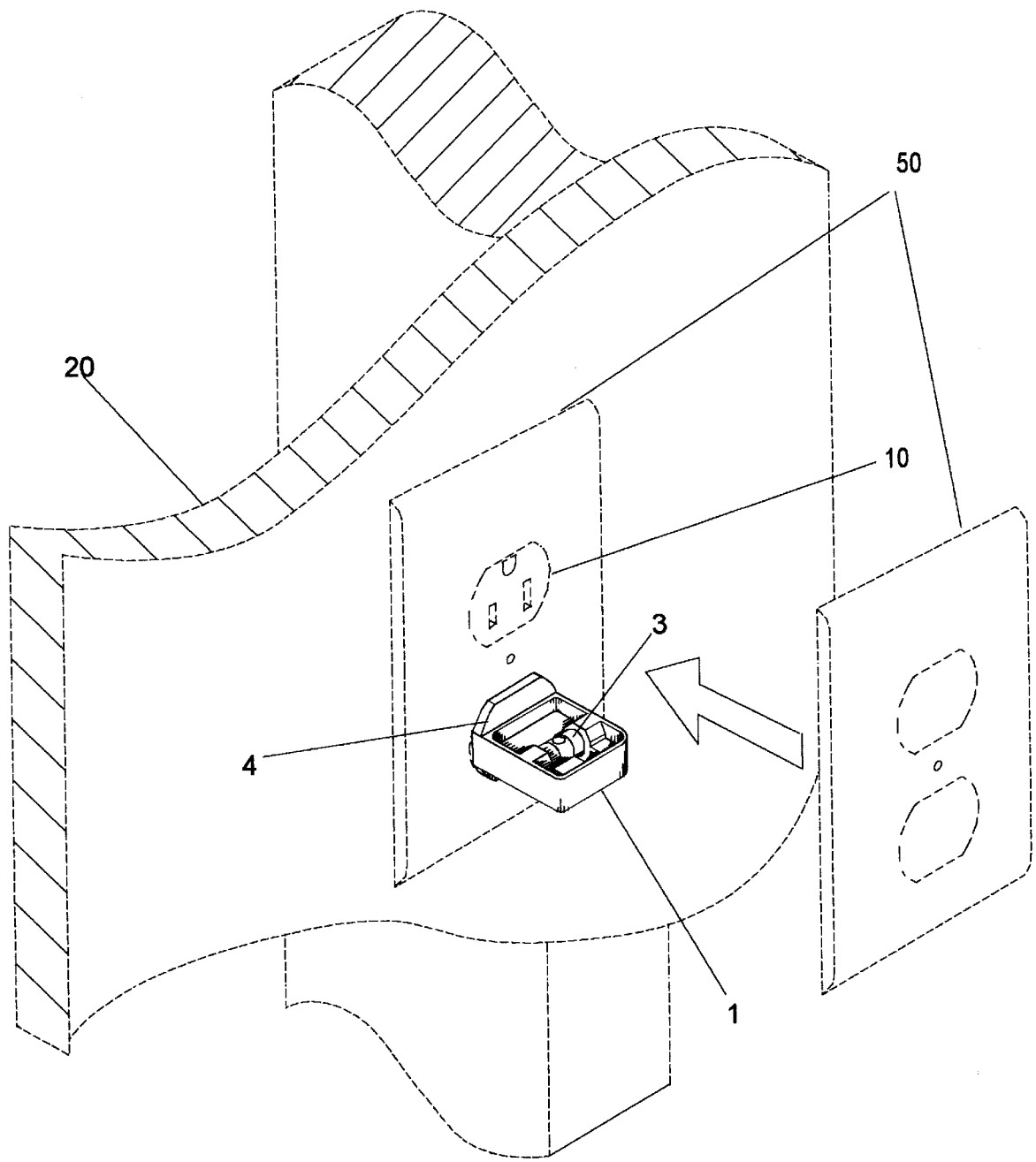
FIG. 7 shows how a cover plate can be installed on a receptacle with the present invention installed in the receptacle.

The receptacle level 1, is a boon for electricians with only one functional hand as it simplifies a difficult task. As can be seen in FIG. 5, one can level the electrical wall outlet 10 by inserting the receptacle level 1 into the electrical wall outlet 10, by reading the liquid bubble level 3 and adjusting or rotating the electrical wall outlet 10 as required for proper alignment, or leveling, of the electrical wall outlet 10. After leveling, the electrical wall outlet 10 is secured in the leveled position to the wall section 20. Many times there is a box that is attached either directly to wallboard or to a stud behind a wall. Then, as shown in FIG. 7, a cover plate 50, which fits around the receptacle level 1, is mounted on the electrical wall outlet 10. The receptacle level 1 is then removed from the electrical wall outlet 10 and to level the coverplate as it is fastened, usually by a screw, to the electrical wall outlet 10. The receptacle level 1 has a variety of flat and plane surfaces and edges so as to permit use as a level against the sides or top or bottom of the coverplate 50.

A major advantage of the receptacle level 1, fitting through the openings shown in the cover plate 50 is that one does not have to remove the receptacle level 1 from the electrical wall outlet 10, then put the receptacle level 1 in a pocket, then put on the cover plate 50, then pull out the receptacle level 1 from the pocket, and then proceed to level the cover plate 50. One can level the electrical wall outlet 10, place the cover plate 50 in position, then grasp the receptacle level 1, remove the receptacle level 1 from the electrical wall outlet 10, and then level the cover plate 50. It saves handling, which is important on repetitive installations such as construction electricians often encounter. The receptacle level 1 in the preferred embodiment of the present invention has dimensions such that fits into an electrical wall outlet 10 that is a N.E.M.A. 110 volt standard polarized and grounded electrical wall outlet with a profile such that the matching coverplate 50 to the electrical wall outlet 10 that is a N.E.M.A. 110 volt standard polarized and grounded electrical wall outlet can be installed with said assembly 1 still installed in the electrical wall outlet 10. This is an important feature of the present invention.

The preferred material of construction for the housing 2 which includes the outlet shield 4, the polarized tapered male plug prong 5, and the tapered male plug prong 6, and the ground male plug prong 7 would be a moldable non-conductive plastic that meets the electrical insulation properties required by building and electrical codes in a given locality for electrical wall outlet plugs. The liquid bubble level 3 that I use in my prototype is a common liquid bubble level such as are used in the torpedo level 30 which is typically a multiple bubble level such as is shown in FIG. 3.

Although the description above contains many specificities, these should not be construed as limiting the scope of the invention but merely providing illustrations of some of the presently preferred embodiments of this invention. For example, while the invention is illustrated as applicable to electrical wall outlet such as are used in 110 volt residential and commercial construction, the invention is also applicable with appropriate dimensional alterations to other outlets such as are found for different voltages or are not polarized or are made to standards in force in other countries than the United States of America. In the preferred embodiment of the present invention the housing 2 is molded to match the electrical wall outlets 10 it is intended to level. The receptacle level 1 is inserted into the given electrical wall outlet 10 and used to level the electrical outlet 10 while fastening the electrical wall outlet 10. Then the cover plate 50 is attached to the standard polarized and grounded electrical wall outlet 10, as the receptacle level 1, in the preferred embodiment of the present invention fits within the clearances of the cover plate 50, that is possible while leaving the receptacle level 1 in place. The receptacle level 1 is then removed and then used to level the cover plate 50. The receptacle level 1 fits within the holes in the coverplate 50 so the cover plate 50 will surround the receptacle level and be installable over the receptacle level 1 without removing the receptacle level 1. Then the present invention can be unplugged. This saves extra handling of the receptacle level 1.

Thus the scope of the invention should be determined by the appended claims and their legal equivalents rather than by the examples given.

I claim:

1. A receptacle level for leveling electrical outlets, said receptacle level comprising a housing comprising:

a) prongs that are complementary to an electrical outlet and b) a bubble level, wherein said receptacle level has a profile that fits within clearances in a coverplate that matches to and is intended for the electrical outlet to be leveled.

\* \* \* \* \*